United States Patent
Chandrasekhar et al.

(10) Patent No.: US 9,182,874 B2
(45) Date of Patent: Nov. 10, 2015

(54) SYSTEM AND METHOD FOR OUT-OF-BAND COMMUNICATION BETWEEN A REMOTE USER AND A LOCAL USER OF A SERVER

(75) Inventors: Babu K. Chandrasekhar, Round Rock, TX (US); Alaa A. Yousif, Round Rock, TX (US); Wei G. Liu, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 742 days.

(21) Appl. No.: 13/017,406

(22) Filed: Jan. 31, 2011

(65) Prior Publication Data
US 2012/0198349 A1    Aug. 2, 2012

(51) Int. Cl.
| | |
|---|---|
| *G06F 15/177* | (2006.01) |
| *G06F 3/048* | (2013.01) |
| *G06F 3/0484* | (2013.01) |
| *G06F 13/00* | (2006.01) |
| *G06F 15/16* | (2006.01) |
| *H04L 12/26* | (2006.01) |

(52) U.S. Cl.
CPC ...... *G06F 3/048* (2013.01); *G05B 2219/13144* (2013.01); *G05B 2219/32128* (2013.01); *G06F 3/04847* (2013.01); *G06F 13/00* (2013.01); *G06F 15/161* (2013.01); *H04L 12/26* (2013.01)

(58) Field of Classification Search
CPC ... G06F 13/00; G06F 3/04847; G06F 15/161; G05B 2219/12144; G05B 2219/32128; H04L 12/26
USPC .................. 715/740, 736, 738, 748, 761, 778
See application file for complete search history.

(56) References Cited

U.S. PATENT DOCUMENTS

| | | | | |
|---|---|---|---|---|
| 4,734,931 A | * | 3/1988 | Bourg et al. ............... | 379/93.01 |
| 4,739,509 A | * | 4/1988 | Bourg ......................... | 379/93.01 |
| 4,748,656 A | * | 5/1988 | Gibbs et al. ................ | 379/93.05 |
| 5,400,331 A | * | 3/1995 | Lucak et al. ................. | 370/401 |
| RE35,050 E | * | 10/1995 | Gibbs et al. ................ | 379/93.05 |
| 5,471,461 A | * | 11/1995 | Engdahl et al. ............. | 370/252 |
| 5,491,531 A | * | 2/1996 | Adams et al. ................ | 375/354 |
| 5,493,571 A | * | 2/1996 | Engdahl et al. ............. | 370/514 |
| 5,537,549 A | * | 7/1996 | Gee et al. ..................... | 709/224 |
| 5,553,095 A | * | 9/1996 | Engdahl et al. ............. | 375/222 |
| 5,900,005 A | * | 5/1999 | Saito ............................ | 715/210 |
| 6,007,631 A | * | 12/1999 | Prentice et al. .............. | 118/669 |

(Continued)

OTHER PUBLICATIONS

Bing search q=what+is+a+craft+interface&qs=HS&fo Mar. 11, 2015.*

(Continued)

*Primary Examiner* — Boris Pesin
*Assistant Examiner* — John Heffington
(74) *Attorney, Agent, or Firm* — Larson Newman, LLP (57) ABSTRACT

A server chassis includes a server, a chassis management controller, and a local interface card. The server includes a controller that is configured to provide a remote user with access to a controller communication portal of the server via a remote access controller graphical user interface, and to send a message from the controller communication portal to a chassis management controller. The chassis management controller is configured to receive the message, to determine that the message is for a local interface card, and to send the message to the local interface card. The local interface card is configured to display the message on a screen connected to the local interface card, to detect a communication request, to display a communication interface at the screen, to receive a reply message via the communication interface, and to send the reply message to the chassis management controller.

20 Claims, 7 Drawing Sheets

(56) References Cited

U.S. PATENT DOCUMENTS

| | | | | |
|---|---|---|---|---|
| 6,065,053 | A * | 5/2000 | Nouri et al. | 709/224 |
| 6,073,255 | A * | 6/2000 | Nouri et al. | 714/31 |
| 6,088,816 | A * | 7/2000 | Nouri et al. | 714/31 |
| 6,122,746 | A * | 9/2000 | Nouri et al. | 713/310 |
| 6,122,758 | A * | 9/2000 | Johnson et al. | 714/47.2 |
| 6,134,668 | A * | 10/2000 | Sheikh et al. | 713/310 |
| 6,138,250 | A * | 10/2000 | Nouri et al. | 714/31 |
| 6,145,098 | A * | 11/2000 | Nouri et al. | 714/31 |
| 6,163,849 | A * | 12/2000 | Nouri et al. | 713/324 |
| 6,189,109 | B1 * | 2/2001 | Sheikh et al. | 714/1 |
| 6,199,173 | B1 * | 3/2001 | Johnson et al. | 714/3 |
| 6,202,160 | B1 * | 3/2001 | Sheikh et al. | 713/310 |
| 6,243,838 | B1 * | 6/2001 | Liu et al. | 714/57 |
| 6,249,885 | B1 * | 6/2001 | Johnson et al. | 714/47.2 |
| 6,330,690 | B1 * | 12/2001 | Nouri et al. | 714/23 |
| 6,338,150 | B1 * | 1/2002 | Johnson et al. | 714/39 |
| 7,139,861 | B2 | 11/2006 | Lee | |
| 7,234,964 | B1 | 6/2007 | Karstens | |
| 7,237,206 | B2 * | 6/2007 | Kasper, II | 715/805 |
| 7,299,277 | B1 * | 11/2007 | Moran et al. | 709/224 |
| 7,305,494 | B2 | 12/2007 | Lee | |
| 7,423,642 | B2 | 9/2008 | Peer et al. | |
| 7,460,086 | B1 * | 12/2008 | Cunningham et al. | 345/3.1 |
| 7,873,847 | B2 * | 1/2011 | Bozek et al. | 713/310 |
| 8,612,801 | B2 * | 12/2013 | Weilnau et al. | 714/22 |
| 2001/0044843 | A1 * | 11/2001 | Bates et al. | 709/224 |
| 2004/0100491 | A1 * | 5/2004 | Kasper, II | 345/744 |
| 2004/0153786 | A1 * | 8/2004 | Johnson et al. | 714/25 |
| 2005/0006109 | A1 * | 1/2005 | McSheffrey et al. | 169/75 |
| 2005/0010709 | A1 * | 1/2005 | Davies et al. | 710/305 |
| 2005/0102549 | A1 * | 5/2005 | Davies et al. | 714/4 |
| 2005/0125524 | A1 | 6/2005 | Chandrasekhar et al. | |
| 2005/0165821 | A1 * | 7/2005 | Gest | 707/102 |
| 2005/0207105 | A1 * | 9/2005 | Davies | 361/683 |
| 2005/0237194 | A1 * | 10/2005 | VoBa | 340/572.1 |
| 2005/0246568 | A1 * | 11/2005 | Davies | 714/2 |
| 2006/0080579 | A1 * | 4/2006 | Rothman et al. | 714/43 |
| 2006/0136704 | A1 * | 6/2006 | Arendt et al. | 713/2 |
| 2006/0212143 | A1 | 9/2006 | Nguyen et al. | |
| 2007/0101193 | A1 * | 5/2007 | Johnson et al. | 714/25 |
| 2007/0168481 | A1 | 7/2007 | Lambert et al. | |
| 2007/0178970 | A1 * | 8/2007 | LeMay et al. | 463/42 |
| 2007/0220301 | A1 * | 9/2007 | Brundridge et al. | 714/4 |
| 2007/0260606 | A1 | 11/2007 | Yousif et al. | |
| 2008/0005222 | A1 | 1/2008 | Lambert et al. | |
| 2008/0022028 | A1 * | 1/2008 | Yin | 710/301 |
| 2008/0034239 | A1 | 2/2008 | Lambert et al. | |
| 2008/0104243 | A1 * | 5/2008 | Roscoe et al. | 709/226 |
| 2008/0126627 | A1 * | 5/2008 | Chandrasekhar et al. | 710/62 |
| 2008/0140819 | A1 * | 6/2008 | Bailey et al. | 709/223 |
| 2008/0143539 | A1 * | 6/2008 | McSheffrey et al. | 340/584 |
| 2008/0259555 | A1 * | 10/2008 | Bechtolsheim et al. | 361/686 |
| 2009/0040135 | A1 * | 2/2009 | Piazza et al. | 345/2.1 |
| 2009/0055157 | A1 * | 2/2009 | Soffer | 703/27 |
| 2009/0055665 | A1 * | 2/2009 | Maglione et al. | 713/320 |
| 2009/0100194 | A1 | 4/2009 | Bhadri et al. | |
| 2009/0182228 | A1 * | 7/2009 | Pierce | 600/437 |
| 2009/0193013 | A1 * | 7/2009 | Hazlewood et al. | 707/5 |
| 2009/0216779 | A1 * | 8/2009 | Hazlewood et al. | 707/100 |
| 2009/0319808 | A1 * | 12/2009 | Brundridge et al. | 713/300 |
| 2010/0013594 | A1 * | 1/2010 | Komine et al. | 340/5.8 |
| 2010/0064169 | A1 * | 3/2010 | Davies et al. | 714/6 |
| 2010/0111309 | A1 | 5/2010 | Khatri et al. | |
| 2010/0146346 | A1 * | 6/2010 | Johnson et al. | 714/48 |
| 2010/0146592 | A1 * | 6/2010 | Gamare et al. | 726/4 |
| 2010/0235484 | A1 * | 9/2010 | Bolan et al. | 709/223 |
| 2011/0004680 | A1 * | 1/2011 | Ryman | 709/224 |
| 2011/0010566 | A1 * | 1/2011 | Bandholz et al. | 713/300 |
| 2011/0029734 | A1 * | 2/2011 | Pope et al. | 711/118 |
| 2011/0035611 | A1 * | 2/2011 | Brey et al. | 713/320 |
| 2011/0093575 | A1 * | 4/2011 | Dube et al. | 709/223 |
| 2011/0116376 | A1 * | 5/2011 | Pacella et al. | 370/235 |
| 2011/0241873 | A1 * | 10/2011 | McSheffrey et al. | 340/539.17 |
| 2012/0065797 | A1 * | 3/2012 | Brian et al. | 700/295 |
| 2012/0072745 | A1 * | 3/2012 | Ahluwalia et al. | 713/320 |
| 2012/0096166 | A1 * | 4/2012 | Devarapalli et al. | 709/226 |
| 2012/0116590 | A1 * | 5/2012 | Florez-Larrahondo et al. | 700/275 |
| 2012/0119917 | A1 * | 5/2012 | McSheffrey et al. | 340/626 |
| 2012/0137289 | A1 * | 5/2012 | Nolterieke et al. | 718/1 |
| 2012/0185624 | A1 * | 7/2012 | Dang et al. | 710/104 |
| 2012/0192007 | A1 * | 7/2012 | Weilnau et al. | 714/14 |
| 2013/0073110 | A1 * | 3/2013 | Johnson et al. | 700/299 |

OTHER PUBLICATIONS

Using the craft interface verilink craft interface, Mar. 21, 2006.*
Bing search q=remote%20chassis%20controller%20ou Jun. 18, 2015.*
Bing search q=remote%20server%20chassis%20contro Jun. 18, 2015.*
Bing search q=remote%20server%20chassis%20contro gui.*
Bing search q=remote%20server%20chassis%20contro user interface Jun. 18, 2015.*
Bing search q=remote%20server%20chassis%20contro user interface b Jun. 18, 2015.*
Bing search q=remote+access+server+diagnostic&sr Apr. 5, 2015.*
Bing search q=what+is+a+craft+interface&qs=HS&fo.*
Verilink, using the craft interface verilink craft interface Mar. 21, 2006.*

* cited by examiner

SYSTEM AND METHOD FOR OUT-OF-BAND COMMUNICATION BETWEEN A REMOTE USER AND A LOCAL USER OF A SERVER

FIELD OF THE DISCLOSURE

This disclosure generally relates to information handling systems, and more particularly relates to a system and method for out-of-band communication between a remote user and a local user of a server.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system, such as a server, can be accessed by both a remote user and a local user at the same time. The remote user can log on to the server and configure system settings via a graphical user interface. The remote user can connect to a controller of the server via an out-of-band communication link so that the remote user can communicate with the server. The local user can access the server and configure system settings via a keyboard, video, and mouse (KVM) within a server chassis.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
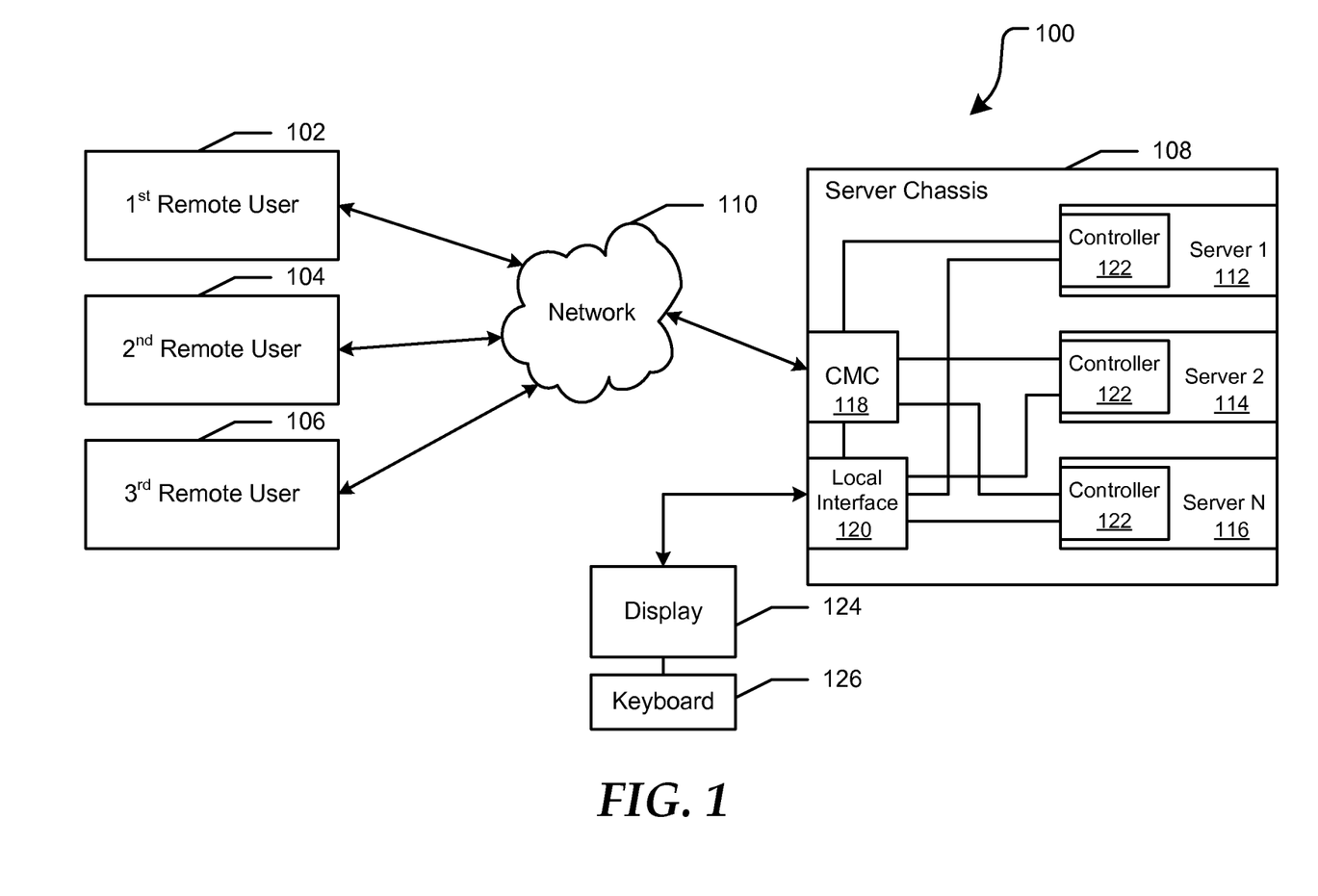
FIG. 1 is a block diagram of a server chassis control system.

FIG. 1 shows a server chassis control system 100 of information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The server chassis control system 100 includes remote users 102, 104, and 106, which can all communicate with a server chassis 108 via a network 110. The server chassis 108 includes servers 112, 114, and 116, a chassis management controller (CMC) 118, and a local interface card 120. Each of the servers 112, 114, and 116 can include a controller 122. The remote users 102, 104, and 106 can each communicate with the controller 122 of each of the servers 112, 114, and 116, with the CMC 118, and with the network 110. The CMC 118 is in communication with the local interface card 120, and with the controller 122 of each of the servers 112, 114, and 116. The local interface card 120 is in communication with the controller 122 of each of the servers 112, 114, and 116, with a local display 124, and with a local keyboard 126.

The local interface card 120 can be an integrated keyboard, video, and mouse (iKVM) interface card that can provide a local user with access to each of the servers 112, 114, and 116. Each of the controllers 122 can be any type of controller, such as an integrated Dell Remote Access Controller (iDRAC), which is an interface card that can provide out-of-band management of the server 112, 114, or 116. The controllers 122 can each have a processor, a memory, a battery, a network connection, and access to a server chassis bus. The controller 122 can provide different functions for the server 112, 114, or 116, such as power management, virtual media access, and remote console capabilities. The power management, the virtual media access, and the remote console capabilities can all be available through a graphical user interface (GUI) on a web browser of the remote user 102, 104, or 106. Thus, the remote users 102, 104, and 106 can configure the servers 112, 114, and 116 of the server chassis 108, as if the remote user was at the local console.

The remote user 102 can be a remote iDRAC user, such that the remote user can utilize a remote access controller GUI 200 to log on to or connect with the controller 122 of each of the server 112, 114, and 116 to configure each individual server. The remote user 104 can be a remote CMC user, such that the remote user can utilize a CMC GUI to log on to or connect with the CMC 118 to control and configure the servers 112, 114, and 116. The remote user 106 can be a remote virtual KVM (vKVM) user, such that the remote user can utilize a vKVM GUI to log on to or connect with the local interface card 120 to control and configure the servers 112, 114, and 116.

Figure 2:
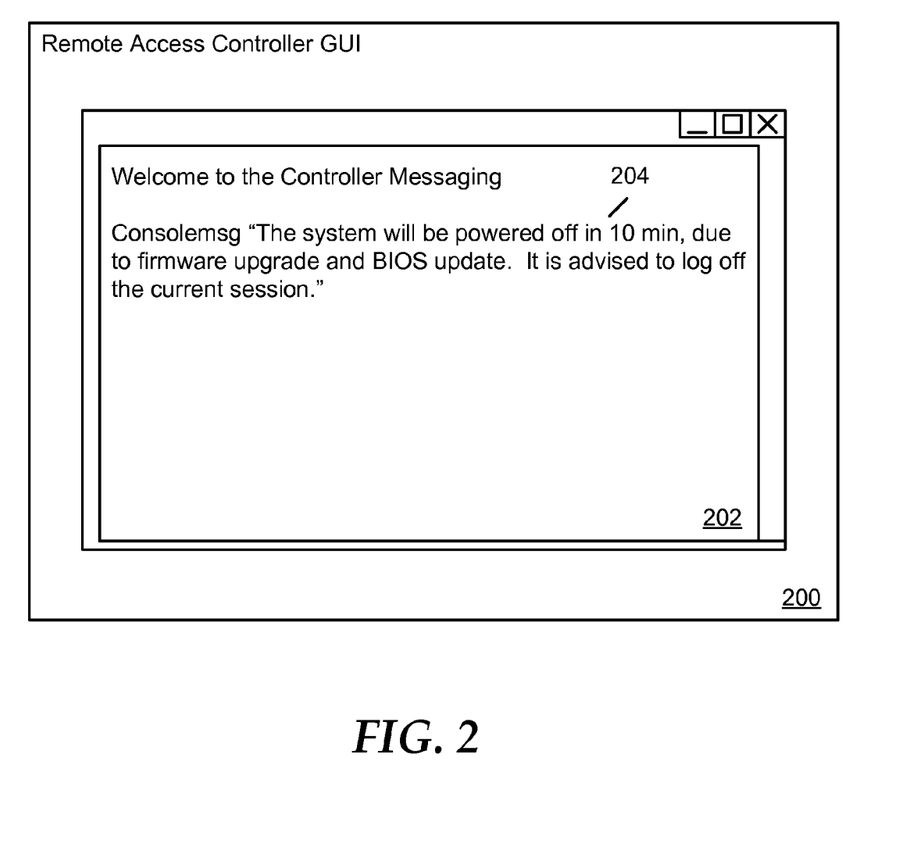
FIG. 2 is an exemplary screen shot of a controller messaging screen on a remote access controller graphical user interface.

A local user can utilize the local interface card 120, the local display 124, and the keyboard 126 to access one of the servers 112, 114, and 116. The local user can select a desired server 112, 114, or 116, and can then access or configure the server. However, while the local user is connected to one of the servers, such as the server 112, the remote user 102 can connect to the same server via the remote access controller GUI 200 as shown in FIG. 2. The remote user 102 can then configure the server 112 via the remote access controller GUI 200 and the controller 122 of the server.

If the remote user 102 needs to perform an operation on the server 112 that requires the server to be restarted or that needs individual control of the server, the remote user can access a controller messaging screen 202 on the remote access controller GUI 200 to send a notification message to the local user. Different types of operations that can require such actions can include a firmware upgrade, a basic input/output system (BIOS) update, installing an operating system, needing access to a resource on the server that may only be accessed by one user at a time, or the like.

FIG. 2 shows an exemplary screen shot of the controller messaging screen 202 on the remote access controller GUI 200. The remote user 102 can type a message 204 into the controller messaging screen 202, such as a message to inform the local user that the server 112 is going to be powered off. The controller 122 of the server 112 can send the message 204 to the CMC 118. When the CMC 118 receives the message 204, the CMC can determine that the message is intended for the local interface card 120 and can send the message to the local interface card. Alternatively, the remote user 104 can utilize the CMC GUI and the CMC 118 to broadcast a message to the controller 122 of each of the servers 112, 114, and 116, and to the local interface card 120.

Figure 3:
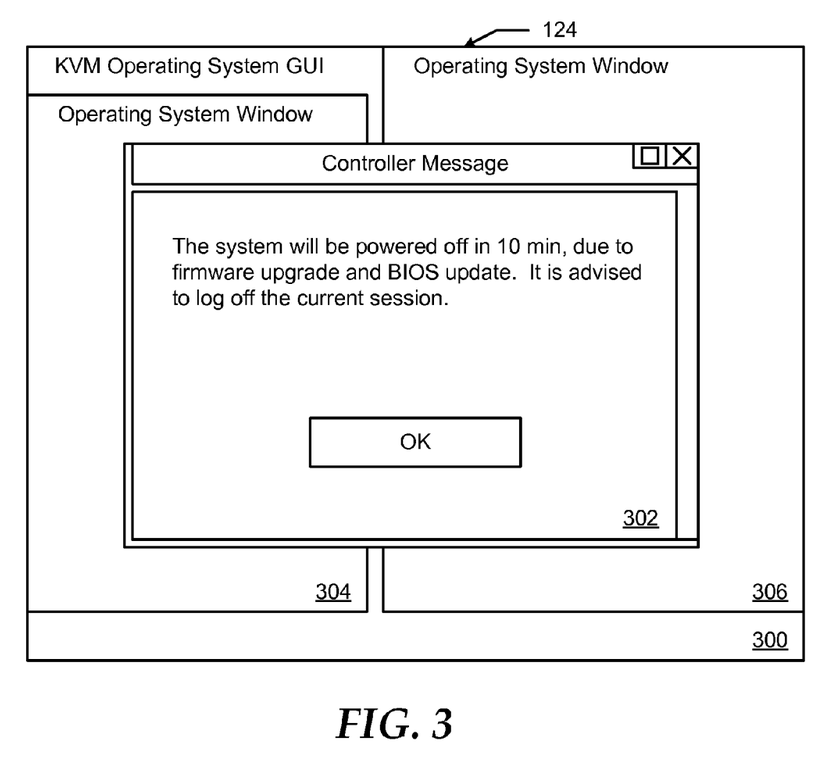
FIG. 3 is an exemplary screen shot of a received controller message on a keyboard, video, and mouse graphical user interface.

FIG. 3 shows an exemplary screen shot of a received controller message 302 on an iKVM GUI 300 on the local display 124. The iKVM GUI 300 can include the received controller message 302, and operating system windows 304 and 306 that the local user is utilizing to access the server 112. The local interface card 120 can display the received controller message 302 on the local display 124 during any operational state of the server. For example, when the local user is connected to the server 112, the received controller message 302 can be displayed in front of the operating system windows 304 and 306. Alternatively, if the local user has not logged onto the server 112, the received controller message 302 can be displayed in front of a login screen on the local display 124. The server states can include when the server is in a power-on self-test (POST), when the server is running an operating system, when the server is powered off, or the like. If the local user would like to send a message to the remote user 102, such as to have the server 112 powered on for longer than stated in the received controller message 302, the local user can press a hotkey on the keyboard 126 to access a communication interface 402 as shown in FIG. 4.

Figure 4:
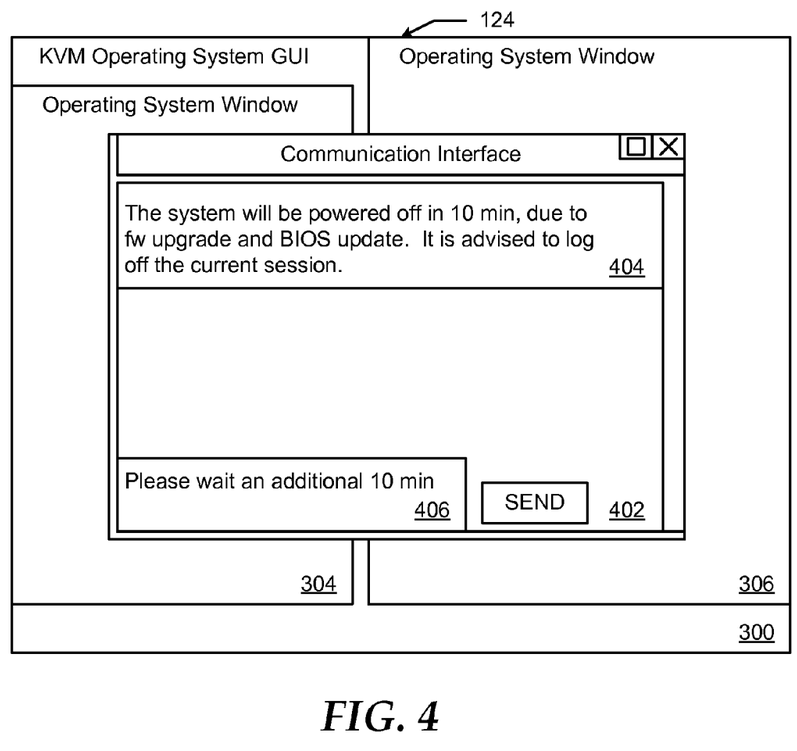
FIG. 4 is an exemplary screen shot of a communication interface on the keyboard, video, and mouse graphical user interface.

FIG. 4 shows an exemplary screen shot of the communication interface 402 displayed on the iKVM GUI 300 of the local display 124. The communication interface 402 can include a previously received message 404, such as the received controller message 302 of FIG. 3, and a reply message 406. The communication interface 402 can provide an open dialog between the local user and the remote user 102 so that neither user configures or accesses the server 112 in such a way that would be destructive to the other user. When the local user has entered the reply message 406 into the communication interface 402, the local interface card 120 can receive the reply message from the communication interface.

The local interface card 120 can then send the reply message 406 to the CMC 118, which can determine that the reply message is intended for the remote user 102 of the controller 122 of the server 112. The CMC 118 can then send the reply message 406 to the controller 122 of the server 112, which can display the reply message on the remote access controller GUI 200. While the communication has been described for the remote user 102 and the local user connected to the server 112 via the CMC 118, the local interface card 120, and the controller 122, the communication can take place between any two of the users for any of the servers.

Figure 5:
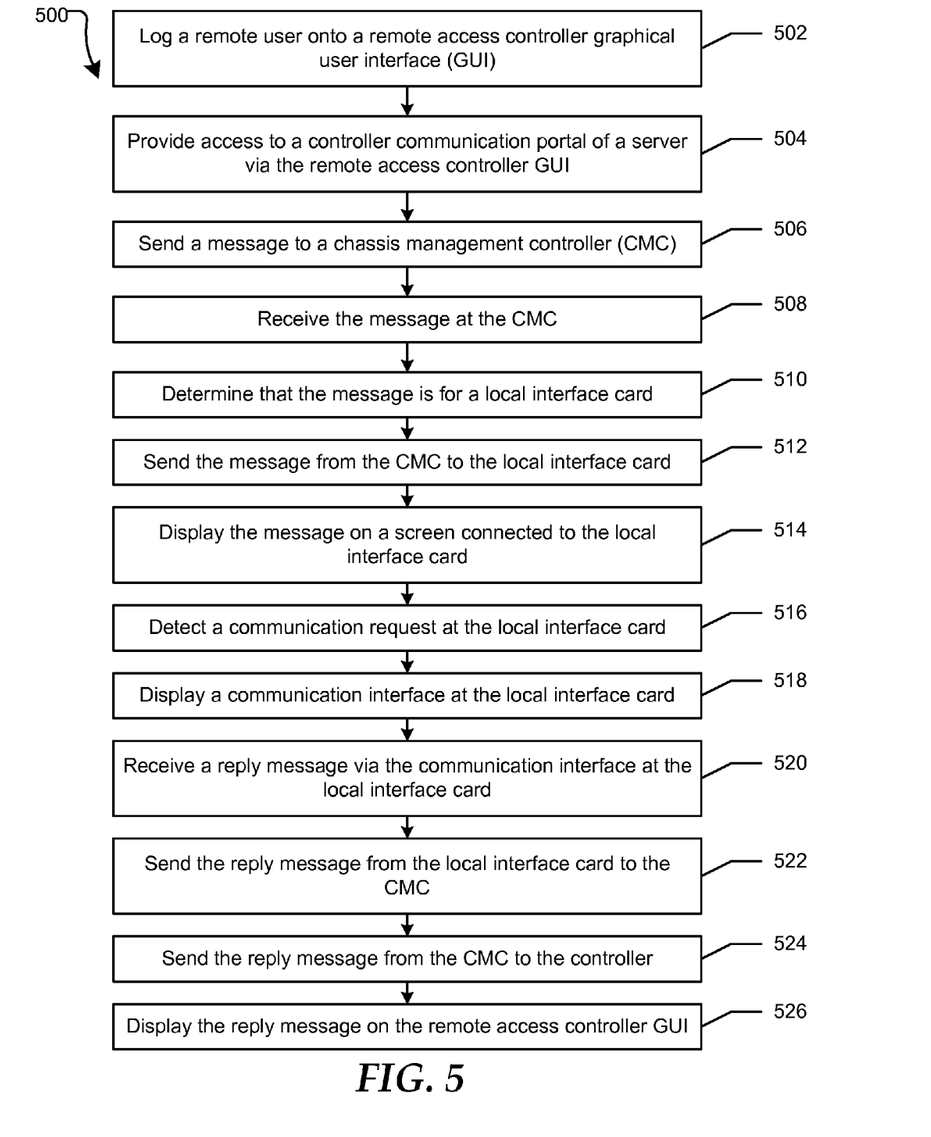
FIG. 5 is a flow diagram of a method for communicating between a remote user and a local user of a server in the server chassis control system.

FIG. 5 shows a method 500 for communicating between a remote access controller of a server and a local user of the server. At block 502, a remote user is logged onto a remote access controller GUI. The remote access controller GUI can provide the remote user with access to a controller, such as a Dell Remote Access Controller, of a server. Access to a controller communication portal of the server is provided to the remote user via the remote access controller GUI at block 504. At block 506, a message is sent from the controller communication portal to a CMC of the server chassis. The message can include that the server is going to be powered off in a specific amount of time. The message is received at the CMC at block 508.

At block 510, the CMC determines that the message is for a local interface card. The local interface card can be an iKVM as described above. The message is sent from the CMC to the local interface card at block 512. At block 514, the message is displayed on a screen connected to the local interface card. The message can be displayed during any server state, such as when the server is in POST, when the server is running an operating system, when the server is powered off, or the like. A communication request is detected at the local interface card at block 516. The communication request can be in response to a user pressing a hotkey on a keyboard connected to the local interface card.

At block 518, a communication interface is displayed at the screen of the local interface card. A reply message is received at the local interface card via the communication interface at block 520. At block 522, the reply message is sent the local interface card to the CMC from. The reply message is sent from the CMC to the controller communication portal of the controller at block 524. At block 526, the reply message is displayed on the remote access controller GUI.

Figure 6:
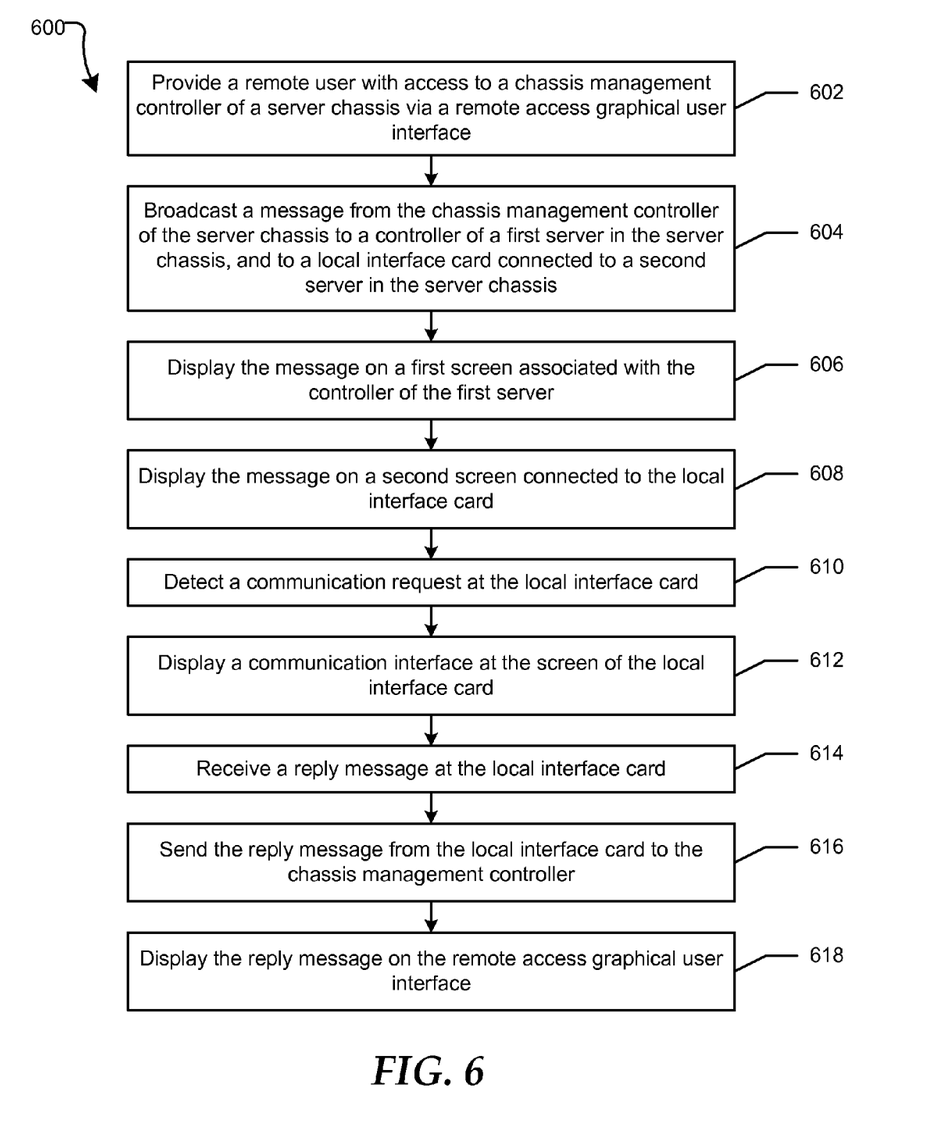
FIG. 6 is a flow diagram of an alternative method for communicating between the remote user and the local user of the server in the server chassis control system.

FIG. 6 shows an alternative method 600 for communicating between a remote user and a local user of a server in the server chassis control system. At block 602, access to a chassis management controller of the server chassis provided to a remote user via a remote access graphical user interface. A message is broadcast from the chassis management controller of the server chassis to a controller of a first server in the server chassis, and to a local interface card connected to a second server in the server chassis at block 604. The message can indicate that the first server and the second server to be powered off in a specific amount of time.

At block 606, the message is displayed on a first screen associated with the controller of the first server. The message is displayed on a second screen connected to the local interface card at block 608. The message can displayed during any server state, such as when the server is in power-on self-test, when the server is running an operating system, and when the server is powered off. At block 610, a communication request is detected at the local interface card. The communication request can be in response to a user pressing a hotkey on a keyboard connected to the local interface card. A communication interface is displayed at the screen of the local interface card at block 612. A reply message is received at the local interface card at block 614. At block 616, the reply message is sent from the local interface card to the chassis management controller. The reply message is displayed on the remote access graphical user interface at block 618.

Figure 7:
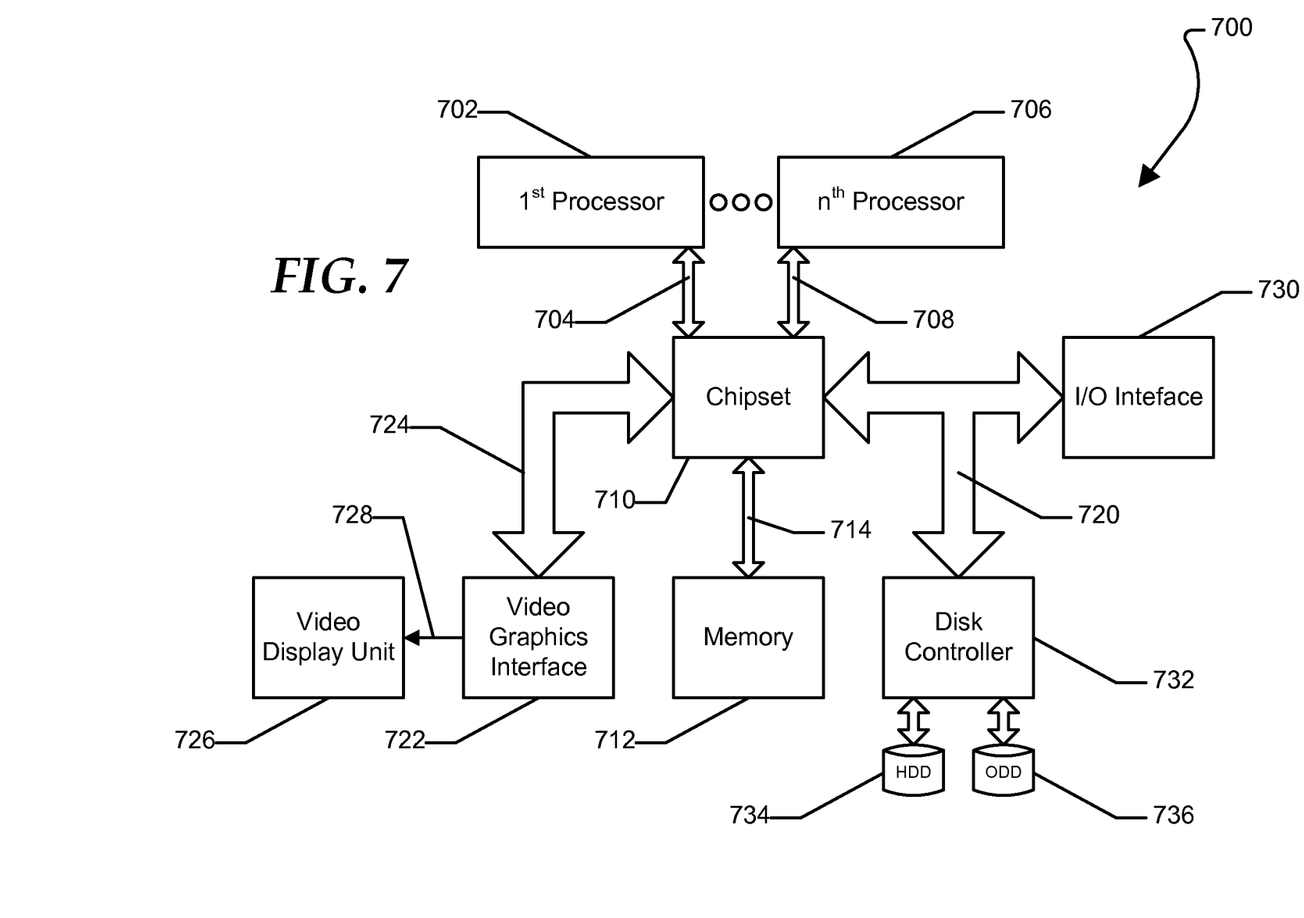
FIG. 7 is a block diagram of a general information handling system.

FIG. 7 illustrates a block diagram of a general information handling system, generally designated at 700. In one form, the information handling system 700 can be a computer system such as a server. As shown in FIG. 7, the information handling system 700 can include a first physical processor 702 coupled to a first host bus 704 and can further include additional processors generally designated as $n^{th}$ physical processor 706 coupled to a second host bus 708. The first physical processor 702 can be coupled to a chipset 710 via the first host bus 704. Further, the $n^{th}$ physical processor 706 can be coupled to the chipset 710 via the second host bus 708. The chipset 710 can support multiple processors and can allow for simultaneous processing of multiple processors and support the exchange of information within information handling system 700 during multiple processing operations.

According to one aspect, the chipset 710 can be referred to as a memory hub or a memory controller. For example, the chipset 710 can include an Accelerated Hub Architecture (AHA) that uses a dedicated bus to transfer data between first physical processor 702 and the $n^{th}$ physical processor 706. For example, the chipset 710, including an AHA enabled-chipset, can include a memory controller hub and an input/output (I/O) controller hub. As a memory controller hub, the chipset 710 can function to provide access to first physical processor 702 using first bus 704 and $n^{th}$ physical processor 706 using the second host bus 708. The chipset 710 can also provide a memory interface for accessing memory 712 using a memory bus 714. In a particular embodiment, the buses 704, 708, and 714 can be individual buses or part of the same bus. The chipset 710 can also provide bus control and can handle transfers between the buses 704, 708, and 714.

According to another aspect, the chipset 710 can be generally considered an application specific chipset that provides connectivity to various buses, and integrates other system functions. For example, the chipset 710 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 710. The chipset 710 can also be packaged as an application specific integrated circuit (ASIC).

The information handling system 700 can also include a video graphics interface 722 that can be coupled to the chipset 710 using a third host bus 724. In one form, the video graphics interface 722 can be an Accelerated Graphics Port (AGP) interface to display content within a video display unit 726. Other graphics interfaces may also be used. The video graphics interface 722 can provide a video display output 728 to the video display unit 726. The video display unit 726 can include one or more types of video displays such as a flat panel display (FPD) or other type of display device.

The information handling system 700 can also include an I/O interface 730 that can be connected via an I/O bus 720 to the chipset 710. The I/O interface 730 and I/O bus 720 can include industry standard buses or proprietary buses and respective interfaces or controllers. For example, the I/O bus 720 can also include a Peripheral Component Interconnect (PCI) bus or a high speed PCI-Express bus. In one embodiment, a PCI bus can be operated at approximately 76 MHz and a PCI-Express bus can be operated at approximately 728 MHz. PCI buses and PCI-Express buses can be provided to comply with industry standards for connecting and communicating between various PCI-enabled hardware devices. Other buses can also be provided in association with, or independent of, the I/O bus 720 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 710 can be a chipset employing a Northbridge/Southbridge chipset configuration (not illustrated). For example, a Northbridge portion of the chipset 710 can communicate with the first physical processor 702 and can control interaction with the memory 712, the I/O bus 720 that can be operable as a PCI bus, and activities for the video graphics interface 722. The Northbridge portion can also communicate with the first physical processor 702 using first bus 704 and the second bus 708 coupled to the $n^{th}$ physical processor 706. The chipset 710 can also include a Southbridge portion (not illustrated) of the chipset 710 and can handle I/O functions of the chipset 710. The Southbridge portion can manage the basic forms of I/O such as Universal Serial Bus (USB), serial I/O, audio outputs, Integrated Drive Electronics (IDE), and ISA I/O for the information handling system 700.

The information handling system 700 can further include a disk controller 732 coupled to the I/O bus 720, and connecting one or more internal disk drives such as a hard disk drive (HDD) 734 and an optical disk drive (ODD) 736 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A server chassis comprising:
 a server including a controller configured to provide a remote user with access to a controller communication portal of the server via a remote access controller graphical user interface, and to send a message from the controller communication portal to a chassis management controller, wherein the message is entered by the remote user via the remote access controller graphical user interface and sent to the chassis management controller;
the chassis management controller in communication with the controller of the server, the chassis management controller configured to receive the message, to determine that the message is for a local interface card, and to send the message to the local interface card; and
the local interface card configured to display the message entered by the remote user on a screen connected to the local interface card, to detect a communication request, to display a communication interface at the screen, to receive a reply message via the communication interface, and to send the reply message to the chassis management controller, wherein the local interface card and the chassis management controller each provide individuals with separate access to the server via the controller of the server, and the local interface card is further configured to provide a local user to the server chassis access to each of a plurality of servers within the server chassis.

2. The server chassis of claim 1 wherein the chassis management controller is further configured to send the reply message to the controller communication portal.

3. The server chassis of claim 1 wherein controller is further configured to display the reply message on the remote access controller graphical user interface.

4. The server chassis of claim 1 wherein the message indicates that the server is to be powered off in a specific amount of time.

5. The server chassis of claim 1 wherein the local interface card is an integrated keyboard, video, and mouse interface.

6. The server chassis of claim 1 wherein the message is displayed in any server state.

7. The server chassis of claim 6 wherein the server state is selected from a group consisting of when the server is in power-on self-test, when the server is running an operating system, and when the server is powered off.

8. The server chassis of claim 1 wherein the communication request is in response to a user pressing a hotkey on a keyboard connected to the local interface card.

9. A method comprising:
providing access to a chassis management controller of a server chassis via a remote access graphical user interface;
broadcasting a message entered by a remote user via the remote access graphical user interface from the chassis management controller of the server chassis to a first controller of a first server in the server chassis and to a local interface card connected to a second controller of a second server in the server chassis, wherein the local interface card and the chassis management controller each provide separate access to the second server via the second controller of the second server, wherein the local interface card provides a local user to the server chassis access to each of a plurality of servers within the server chassis;
displaying the message entered by the remote user on a first screen associated with the controller of the first server;
displaying the message entered by the remote user on a second screen connected to the local interface card;
receiving a reply message at the local interface card;
sending the reply message from the local interface card to the chassis management controller; and
displaying the reply message on the remote access graphical user interface.

10. The method of claim 9 further comprising:
detecting a communication request at the local interface card; and
displaying a communication interface at the screen of the local interface card.

11. The method of claim 10 wherein the communication request is in response to a user pressing a hotkey on a keyboard connected to the local interface card.

12. The method of claim 9 wherein the message indicates that the server is to be powered off in a specific amount of time.

13. The method of claim 9 wherein the message is displayed in any server state.

14. The method of claim 13 wherein the server state is selected from a group consisting of when the server is in power-on self-test, when the server is running an operating system, and when the server is powered off.

15. A method comprising:
providing a remote user with access to a controller communication portal of a server via a remote access controller graphical user interface;
sending a message from the controller communication portal to a chassis management controller of a server chassis, wherein the message is entered by the remote user via the remote access controller graphical user interface and sent to a local user of the server;
receiving the message at the chassis management controller;
determining, in the chassis management controller, that the message is for a local interface card, wherein the local interface card and the chassis management controller each provide separate access to the server via a controller of the server, and the local interface card provides the local user to the server chassis access to each of a plurality of servers within the server chassis;
sending the message from the chassis management controller to the local interface card;
displaying the message entered by the remote user on a screen connected to the local interface card;
detecting a communication request at the local interface card;
displaying a communication interface at the screen of the local interface card;
receiving, from the local user, a reply message at the local interface card via the communication interface;
sending the reply message from the local interface card to the chassis management controller;
sending the reply message from the chassis management controller to the controller communication portal; and
displaying the reply message on the remote access controller graphical user interface.

16. The method of claim 15 wherein the message indicates that the server is to be powered off in a specific amount of time.

17. The method of claim 15 wherein the local interface card is an integrated keyboard, video, and mouse interface.

18. The method of claim 15 wherein the message is displayed in any server state.

19. The method of claim 18 wherein the server state is selected from a group consisting of when the server is in power-on self-test, when the server is running an operating system, and when the server is powered off.

20. The method of claim 15 wherein the communication request is in response to a user pressing a hotkey on a keyboard connected to the local interface card.

* * * * *